United States Patent
Tokutomi et al.

(10) Patent No.: US 7,972,511 B2
(45) Date of Patent: Jul. 5, 2011

(54) ANAEROBIC TREATMENT METHOD AND ANAEROBIC TREATMENT APPARATUS

(75) Inventors: Takaaki Tokutomi, Tokyo (JP); Motoyuki Yoda, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 0 days.

(21) Appl. No.: 12/591,163

(22) Filed: Nov. 10, 2009

(65) Prior Publication Data

US 2010/0133180 A1  Jun. 3, 2010

(51) Int. Cl.
*C02F 3/28* (2006.01)

(52) U.S. Cl. ........ 210/610; 210/616; 210/631; 210/928; 435/262.5

(58) Field of Classification Search ............ 210/603, 210/610, 615, 616, 617, 631, 252, 259, 928; 435/262, 262.5
See application file for complete search history.

(56) References Cited

U.S. PATENT DOCUMENTS

| | | | | |
|---|---|---|---|---|
| 6,015,496 A | * | 1/2000 | Khudenko | 210/603 |
| 2004/0256317 A1 | * | 12/2004 | Yamada et al. | 210/631 |
| 2006/0043018 A1 | * | 3/2006 | Juby | 210/631 |
| 2006/0191846 A1 | * | 8/2006 | Sumino et al. | 210/603 |

FOREIGN PATENT DOCUMENTS

| | | |
|---|---|---|
| JP | 61-197096 | 9/1986 |
| JP | 04-007099 | 1/1992 |
| JP | 4-310294 | 11/1992 |
| JP | 06-154785 | 6/1994 |
| JP | 07-155790 | 6/1995 |
| JP | 2563004 | 9/1996 |
| JP | 08-281284 | 10/1996 |
| JP | 11-285696 | 10/1999 |
| JP | 2000-024687 | 1/2000 |
| JP | 2001-137889 | 5/2001 |
| JP | 2003-024988 | 1/2003 |
| JP | 2003-039093 A * | 2/2003 |
| JP | 2004-000955 | 1/2004 |
| JP | 2005-342588 | 12/2005 |
| JP | 2006-272252 | 10/2006 |

OTHER PUBLICATIONS

International Search Report for PCT/JP2008/055003, mailed Jun. 24, 2008.
Karim K et al., "Effect of shock and mixed nitrophenolic loadings on the performance of UASB reactors", Water Research, Elsevier, Amsterdam, NL, vol. 40, No. 5, Mar. 1, 2006, pp. 935-942.
European Search Report dated Apr. 26, 2011 in corresponding European Patent Application 08722397.0.

* cited by examiner

*Primary Examiner* — Fred Prince

(57) ABSTRACT

A method and apparatus of anaerobic treatment which makes it possible to prevent disintegration of granular sludge and perform high-load high-velocity anaerobic treatment stably even in the case where treatment is performed under conditions where the granular sludge is easily disintegrated. In a reaction tank 20 which retains the granular sludge, nitric acid or nitrous acid is adjusted so that they have a certain concentration range. For example, nitric acid is added to the liquid to be treated by connecting the nitric acid addition path 12 to a midway point of the path of the liquid to be treated 31 which introduces the liquid to be treated to the reaction tank 20, and nitric acid is mixed with the liquid to be treated. By introducing nitric acids within the reaction tank 20, denitrifying bacteria etc. can multiply, and disintegration of the granules is prevented.

13 Claims, 5 Drawing Sheets

ANAEROBIC TREATMENT METHOD AND ANAEROBIC TREATMENT APPARATUS

CROSS REFERENCE TO RELATED APPLICATIONS

This application is based upon and claims the benefit of priority from the prior Japanese Patent Applications No. 2007-126540, filed on May 11, 2007, No. 2007-126596, filed on May 11, 2007, and No. 2007-126548, filed on May 11, 2007, and PCT Application No. PCT/JP2008/055003, filed on Mar. 18, 2008, the entire contents of which are incorporated herein by reference.

BACKGROUND OF THE INVENTION

1. Field of the Invention

The present invention relates to a method of anaerobic treatment and anaerobic treatment apparatus which treat water containing organic matter by using methane fermentation, and in particular, the present invention is related to a method of anaerobic treatment and apparatus in which water containing organic matter is introduced to a reaction tank which retains granular sludge and an anaerobic biotreatment is performed.

2. Description of the Related Art

A UASB (Upflow Anaerobic Sludge Blanket) process which performs a high-load, high-speed treatment using a high density granular sludge having excellent settling properties is known as an anaerobic treatment method of an organic waste water. In the UASB process, waste water is introduced to a reaction tank which retains a sludge blanket formed by the granular sludge and by passing a liquid in the upflow, contacts with the sludge blanket. In this method, in order to perform a high-load high-speed treatment, organic solids with a slow digestion rate are separated in the case where they are contaminated in the wastewater, and dissolved organic matter with a high digestion rate is biologically treated by the granular sludge. As a treatment method which develops the UASB method and makes a more high-load high-speed treatment possible, an EGSB method (Expanded Granule Sludge Blanket) is also known in which wastewater r is passed at a higher flow rate into a tall reaction tank and the sludge blanket is developed at a high development rate.

In the UASB and EGSB methods, a granular sludge in which anaerobic microorganisms are granulated is used and the sludge containing anaerobic microorganisms is maintained in a granular form and multiplied. A biological treatment method which uses granular sludge can be operated at high-load high-speed because a high sludge retention concentration can be obtained compared to a fixed bed or fluidized bed which retain the microorganisms on a support material. In addition, because the density of microorganisms is high and settling properties are excellent in granular sludge, solid liquid separation is easy. Furthermore, it is recognized as the most efficient anaerobic treatment method because excess granular sludge from an operating reaction tank can be transferred as seed sludge for a new reaction tank, the reaction tank can be started in a short time and a stable treatment can be performed from the start-up period.

In a method such as UASB which uses granular sludge, the most important point for treating stably and successfully wastewater is maintaining and multiplying the granular sludge. If the granular sludge can not be maintained or multiplied within the reaction tank, the ability to treat the wastewater is reduced and eventually becomes impossible to treat.

Granular sludge is formed when microorganisms of an aceticlastic genus *Methanosaeta* (formerly called genus *Methanothrix*) become a skeleton, forms one type of ecosystem in which hydrogenotrophic methanogens, acetic acid bacteria, and acidogens coexist. Even within these microorganisms, acidogens work towards increasing the binding strength between bacteria because they catabolize glucide, lipids and proteins, and produce a viscous substrate. Therefore, if the culture of a sugar substrate is used the strongest granular sludge is produced.

Because wastewater r in general sewage or industrial effluent contains glucide and other high molecular organic matter, acidogens multiply when this is anaerobically treated. In the anaerobic treatment process, the above stated microorganisms other than the acidogens also multiply, organic acids are produced and the organic acids become acetic acid by being catabolized in sequence and further catabolized into methane and carbon dioxide gas. Under the condition that the acidogens multiply, each type of microorganism stated above which participates in the series of anaerobic treatments stated above and multiplies, binds together via the viscous substrate and a very strong granular sludge is formed. Therefore, by passing general wastewater in the upflow and performing anaerobic treatment it is possible to form self generating granular sludge.

However, unlike this usual wastewater r, when a liquid to be treated which has a low substrate concentration of acidogens, for example, a liquid to be treated containing organic matter below carbon number of four which are discharged from a chemical factory etc., is treated, the granular sludge becomes easier to disintegrate. In particular, in the case where a liquid to be treated in which the main components (about 50-90% by mass of total organic matter) are organic matter below carbon number of two such as acetic acid, methanol, ethanol and acetaldehyde, microorganisms multiply with genus *Methanosarcina* as the dominant species.

It is difficult for bacteria of genus *Methanosaeta*, genus *Methanosarcina* and genus *Methanobacterium* to form granular sludge, and because the production of a viscous substrate in the granular sludge becomes less, multiplication of the granular sludge becomes anemic and strength is also insufficient. As a result, when a long period of operation is continued of water containing these types of organic matter as the liquid to be treated, the granular sludge is broken down, has a small particle size and the amount of sludge within the reaction tank is reduced.

In particular, in the case of treating a liquid to be treated which has a substrate having carbon number of one, specifically methanol, formic acid, or formaldehyde as the main component, because the above stated genus *Methanosaeta* can not utilize these substrates, Methanogens of genus *Methanosarcina* or genus *Methanobacterium* are grown and become a state which is more difficult to granulate. For example, when methanol as a single substrate is used in a USAB type treatment apparatus which is continuously operated for a long period of time, the granular sludge breaks down, is miniaturized and the amount of sludge is dramatically reduced. As a result, anaerobic treatment with granular sludge of a liquid to be treated which has low molecular organic matter such as those stated above as the main component was difficult.

A treatment method which supplies acetic acid or a substance which produces acetic acid when an anaerobic treatment using a granular sludge such as USAB is initiated, has been proposed (for example, Japanese Registered Patent No. 2563004). In the method disclosed in Japanese Registered Patent No. 2563004, when an apparatus for treating wastewater which are difficult to granule as stated above, is initiated, acetic acid or a substrate which produces an acetic acid is provided, methanogens of genus *Methanosaeta* are caused to dominatedly multiply and the granular sludge is caused to disintegrate in a short period of time.

However, because genus *Methanosaeta* can use a low molecular compound as a substrate, if the introduction of acetic acid is terminated after initiating an anaerobic treatment using granular sludge using the method disclosed in patent document 1, methanogens of genus *Methanosarcina* or genus *Methanobacterium* gradually grows, and break down of the granule begins.

BRIEF SUMMARY OF THE INVENTION

The present invention attempts to support granular sludge by making the conditions under which microorganisms which contribute to a support of granular sludge within a reaction tank multiply. In this way, it is an aim of the present invention to provide an anaerobic treatment method and anaerobic treatment apparatus which can multiply granular sludge and stably and efficiently perform an anaerobic treatment even in the case where treatment is performed under conditions where the granular sludge is easily disintegrated.

The present invention provides the following:

(1) a method of anaerobic treatment including introducing a liquid to be treated to a reaction tank which retains a granular sludge, and contacting the liquid to be treated with the granular sludge while adding nitric acid or nitrous acid to the liquid to be treated or the reaction tank.

(2) The method of anaerobic treatment described in (1), wherein a liquid which contains nitric acid or nitrous acid is added to the liquid to be treated or the reaction tank so that N becomes equal to or larger than 0.1% and equal to or less than 10% by mass with respect to a CODcr of the liquid to be treated.

(3) The method of anaerobic treatment described in (1) or (2), wherein at the time of flowing the liquid to be treated to the reaction tank, nitric acid or nitrous acid is added so that the concentration of nitric acid or nitrous acid is in a range of 1 to 1,000 mg-N/L.

(4) The method of anaerobic treatment described in one of (1) to (3), wherein the organic matter content having a carbon number of four or less in the liquid to be treated is equal to or more than 70% by mass of the total organic matter content.

(5) The method of anaerobic treatment described in one of (1) to (4), wherein the liquid to be treated contains at least one agent chosen from a group consisting of a chelating agent, a scale dispersant, and a bactericidal agent.

(6) The method of anaerobic treatment described in one of (1) to (5), wherein the anaerobic treatment is performed while supplying a flocculant to the reaction tank.

(7) The method of anaerobic treatment described in one of (1) to (6), wherein a liquid containing a glucide is introduced to the reaction tank.

(8) An anaerobic treatment apparatus including a reaction tank which retains a granular sludge, and a nitric acid/nitrous acid addition means which is connected to the reaction tank and which adds nitric acid or nitrous acid so that a tank liquid within the reaction tank contains nitric acid or nitrous acid.

(9) The anaerobic treatment apparatus described in (8), wherein the nitric acid/nitrous acid addition means includes an additive storage tank which stores nitric acid or nitrous acid and an addition path which supplies a liquid within the additive storage tank to the reaction tank or a liquid to be treated introduced to the reaction tank.

(10) The anaerobic treatment apparatus described in (8) or (9), further including a supplement additive addition means which supplies a flocculant and/or a glucide to the reaction tank.

In the present invention, by providing a substrate of a microorganism which forms granular sludge, the microorganism is caused to produce a viscous substrate, the strength of the granular sludge is increased and disintegration is prevented. It is also possible to use a glucide such as starch as a substance which caused the microorganisms to produce a viscous substrate instead of a nitric acid or nitrous acid. Consequently, it is possible to transform the present invention as follows.

(11) A method of anaerobic treatment including introducing a liquid to be treated to a reaction tank which retains a granular sludge, and adding glucide to the reaction tank or the liquid to be treated and contacting the liquid to be treated with the granular sludge in the case where the amount of organic matter which have a carbon number of four or less contained in the liquid to be treated are 70% by mass or more of the total contained organic matter, in the case where the liquid to be treated contains one or more agents chosen from a group consisting of a chelating agent, a scale dispersant, and a bactericidal agent, or in the case where the sludge load introduced to the reaction tank exceeds 0.3 kgCODcr/kg-vss/d or a upflow velocity within the reaction tank exceeds 1 m/h

(12) The method of anaerobic treatment described in (11) wherein the liquid to be treated is evaporative condensed water which is discharged by a pulp manufacture process.

(13) The method of anaerobic treatment described in (11) or (12) wherein the glucide is starch.

(14) The method of anaerobic treatment described in (13) wherein a starch which has been gelatinized is added as the glucide.

(15) The method of anaerobic treatment described in (13) or (14) wherein the starch is added so that the added amount of starch has a CODcr ratio of 0.02-0.2 with respect to a CODcr concentration of the liquid to be treated.

(16) The method of anaerobic treatment described in one of (11) to (15), wherein the anaerobic treatment is performed while supplying a flocculant to the reaction tank.

(17) The method of anaerobic treatment described in one of (13) to (16), wherein the liquid to be treated is evaporative condensed water which is discharged by a pulp manufacture process, and adding so that the concentration after adding nitric acid or nitrous acid to the reaction tank or liquid to be treated becomes 1-1000 mg/L.

The present invention is related to a method of anaerobic treatment and an anaerobic treatment apparatus in which water containing organic matter is introduced to a reaction tank which retains a granular sludge and which stably retains for a long period of time more than a fixed amount of the granular sludge within the reaction tank by preventing disintegration of the granular sludge. In other words, the present invention multiples the granular sludge from the granular sludge which is already retained within the reaction tank. Furthermore, disintegration of the granular sludge refers to the phenomenon whereby the granular sludge already formed disintegrates while an anaerobic treatment is performed.

Furthermore, "performing anaerobic treatment while adding nitric acid or nitrous acid" means adding nitric acid or nitrous acid so that a certain amount of nitric acid or nitrous acid is supplied to a reaction tank while anaerobic treatment is performed. Therefore, consecutively adding nitric acid or nitrous acid is also equivalent to "while adding nitric acid or nitrous acid" and intermittently adding nitric acid or nitrous acid is also one mode of "while adding nitric acid or nitrous acid".

In addition, nitric acid or nitrous acid is added so that nitric acid or nitrous acid is supplied as ions (in other words, nitric acid ions or nitrous acid ions) to the granular sludge within a reaction tank. Therefore, "adding nitric acid or nitrous acid so that the concentration of nitric acid or nitrous acid in the liquid to be treated when flown into the reaction tank, becomes 1-1000 mg-N/L" means adding a substance which discharges nitric acid ions or nitrous ions so that the concentration of nitric acid ions or nitrous acid ions in the liquid to be treated has the range stated above. Therefore, not only a nitric acid solution but a nitrate may also be added as a nitric acid to a liquid to be treated etc, and nitrate or nitrite for example, is included in "nitric acid or nitrous acid" as a substance which discharges nitric acid ions or nitrous acid ions when adding to a liquid to be treated.

DETAILED DESCRIPTION OF THE INVENTION

Figure 1:
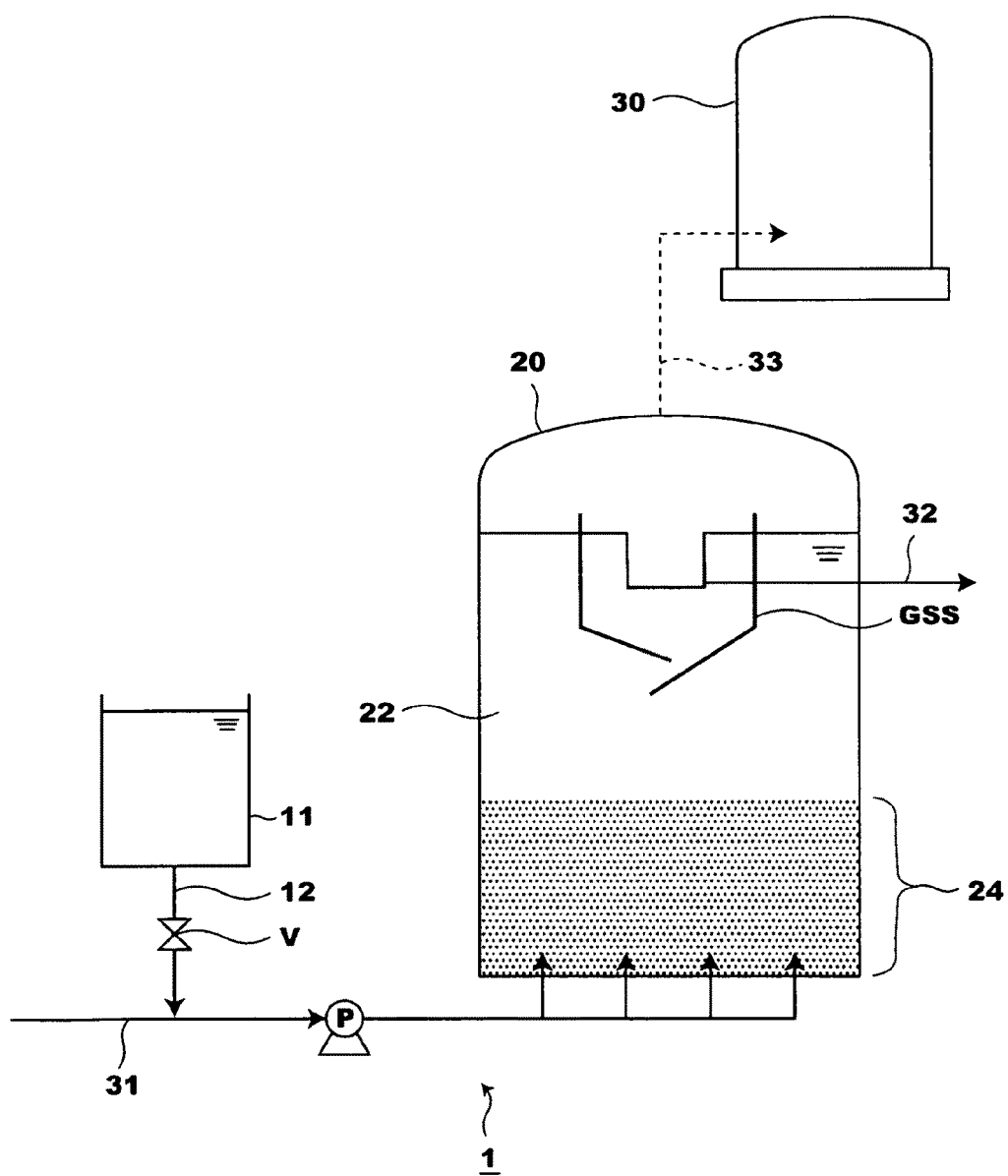
FIG. 1 is an exemplary diagram of biological treatment apparatus related to a first embodiment of the present invention.

The present invention will be explained in detail below using the diagrams. FIG. 1 is an exemplary diagram of an anaerobic treatment apparatus (below referred to simply as "treatment apparatus") 1 for water containing organic matter related to the first embodiment of the present invention. The treatment apparatus 1 is arranged with a nitric acid/nitrous acid addition means and a reaction tank 20. The nitric acid/nitrous acid addition means is here structured as a facility for adding a nitrate and includes a storage tank (below referred to as "nitric acid storage tank") 11 which stores a nitrate solution and a nitric acid addition path 12. A path of a liquid to be treated 31 which introduces a water containing organic matter which is the liquid to be treated, a process liquid path 32 which extracts the liquid already treated, and a gas path 33 which extracts generated gas are connected to the reaction tank 20.

The reaction tank 20 is filled with granular sludge. The path of the liquid to be treated 31 is connected to the lower part of the reaction tank 20. Water containing organic matter is introduced to the reaction tank 20 via a pump P arranged on the path of the liquid to be treated 31 and flows into the reaction tank 20 by an upward flow. In addition, a gas solid separation device (GSS) is arranged on the upper part of the reaction tank 20. The top part of the GSS protrudes from the surface of the liquid within the reaction tank 20. The gas path 33 is connected to the upper part of the reaction tank 20. The process liquid path 32 is connected with the interior of the GSS.

Within the reaction tank 20, the interior of the GSS is the gas solid separation section and the lower section becomes the reaction part 22 where the granular sludge is developed. In the reaction part 22, the granular sludge is developed and a sludge blanket 24 is formed. The granular sludge is sludge in which microorganisms including anaerobic microorganisms self granulate and have a granularity of about 0.5-1.0 mm average granule diameter, and a density of about 1.02-1.1 kg/L with excellent settling properties. The liquid of the reaction part 22 is separated to gas, liquid and solid within the GSS and the liquid to be processed which is separated from the granular sludge is extracted from the liquid to be processed path 32.

In this way, in the process apparatus 1, water containing organic matter flows upwards to the reaction tank 20 which retains the granular sludge, the granular sludge is developed and a sludge blanket 24 is formed. As a result, because the contact efficiency between the water containing organic matter and the granular sludge increases, in UASB where a sludge blanket with a height of about 3-5 m is developed in a reaction tank with a height of about 5-7 m, a high-load high-velocity process in which a sludge load is 0.1-0.7 kg-CODcr/kg-vss/d and upflow velocity is about 0.3-1.5 m/h within the reaction tank is possible. In EGSB which develops the sludge blanket with a height of about 5-18 m within a reaction tank with a height of about 7-20 m, a high-load high-velocity process in which a sludge load is 0.1-1.0 kg-CODcr/kg-vss/d and upflow velocity is 3-10 m/h within the reaction tank is possible.

An organism concentration of CODcr 500-30,000 mg/L and more preferably 1,000-20,000 mg/L is suitable for water containing organic matter which is introduced to the reaction tank 20. In addition, the organism load with respect to the reaction tank 20 is preferred to be 5-30 kg-CODcr/m$^3$/d and in particular 8-20 kg-CODcr/m$^3$/d. In addition, it is preferred that the temperature is set at 25-40° C. and more preferably 30-38° C. as the anaerobic conditions without supplying oxygen to the inside of the reaction tank 20.

Preceding performing anaerobic treatment related to the present invention, the granular sludge of the nature stated above is retained in advance in the reaction tank 20 to about 20-50% per reaction tank volume. By anaerobically treating the liquid to be treated it is possible to form self generating granulated sludge, a flocculant is added to the reaction tank which retains natant anaerobic sludge, self granulation is encouraged and it is possible to self granulate the natant sludge. However, a significant period of time is required to form self generating granular sludge. In addition, when a flocculant is added and the natant sludge is granulated, the density of the granular sludge which is formed sometimes becomes lower.

Thus, if a granular sludge which is discharged as surplus sludge from an existing UASB or EGSB type reaction tank is filled into the reaction tank and water containing organic matter which includes a substrate which multiplies the granular sludge is supplied, it is possible to start up the reaction tank in a short period of time (that is, a reaction tank can be obtained which retains a necessary amount of granular sludge). This is for the following purpose; granular sludge grows within the reaction tank and is crushed by fluidity that comes with the flow of water and production of gas within the reaction tank and the crushed micro granules and fragments become a nucleus and new granule shaped sludge is formed.

In order to perform a treatment stably with UASB, granular sludge with an average particle size diameter of 0.5-3.0 mm, more preferably 0.8-1.5 mm is maintained within the reaction tank 20 so that the above described sludge blanket 24 can be formed. In the case of EGSB, it is necessary to stably retain a granular sludge with an average particle size diameter of 0.5-3.0 mm, more preferably 1.0-1.5 mm within the reaction tank 20.

Here, it is sufficient if the liquid to be treated which is introduced to the reaction tank 20 is a liquid which contains treatable organic matter by contacting the liquid with the granular sludge and performing an anaerobic treatment. However, depending on the nature of the liquid to be treated and the operation conditions of the reaction tank 20, the granular sludge disintegrates while the treatment is continued and the amount of granular sludge retained within the reaction tank 20 sometimes decreases.

The present invention is particularly suitable for a treatment of a liquid to be treated in which granular sludge is easily disintegrated in this way, or a treatment under operation conditions. Water containing organic matter which has a small amount of organic matter (organic matter with a carbon number of five or more such as glucide, fats, and proteins etc.) which become a substrate of acidogens, for example, when the amount of a substrate of acidogens is 30% or less by mass of the total amount of organic matter, and in particular, water containing organic matter which is 20% or less by mass are examples of a liquid to be treated in which granular sludge is easily disintegrated. Specifically, a liquid to be treated mainly including lower organic matter (for example, 70% by mass or more, more preferably 80% by mass of more of the total amount of organic matter) can be given as an example. Here, organic matter with a carbon number of four or less, in particular, 2 or less can be given as examples of a lower organism. The greater the amount of organic matter with a lower carbon number is included the easier disintegration of the granular sludge becomes.

For example, CODcr of an effluent (evaporative condensed water, or evaporate condensate) which is discharged by distillation in order to reuse a cooking liquor which is obtained by digesting a pulp within an alkaline solution, is about 3,000-10,000 mg/L, and 70% or more of this by mass and usually 80-90% by mass is methanol and the organic content which has a carbon number of five or more and which becomes a substrate of acidogens, is about 10-20% by mass. In the present invention, this type of liquid to be treated is particularly suitable for the treatment.

In addition, even when a substrate of acidogens sufficiently exists within the liquid to be treated, in the case where a chelating agent, a scale dispersant and a bactericidal agent etc. are included in the liquid to be treated, because the granular sludge is easily disintegrated, the method of the present invention can be suitably applied. Particularly, in the case where a chelating agent such as EDTA (ethylenediamine tetra acetic acid), NTA (Nitrilotriacetic Acid) is included within the liquid to be treated at a concentration of 3 mg/L or more, the granular sludge easily disintegrates. In addition, dithiocarbamates as a disinfectant have a particular tendency to disintegrate granular sludge.

Furthermore, even in the case where there is no cause for disintegrating the granular sludge in the liquid to be treated itself, the granular sludge is sometimes easily disintegrated depending on the treatment conditions. For example, in the case where the sludge load is high or flow speed of the liquid is high.

For example, in the case of UASB, 0.2-0.6 kg-CODcr/kg-vss/d is suitable for the sludge load and 0.5-1.0 m/h is suitable for the upflow velocity and in the case where the sludge load to the reaction tank 20 exceeds 0.6 kg-CODcr/kg-vss/d, or if the upflow velocity exceeds 1 m/h, the granular sludge is easily disintegrated. In addition, in the case of EGSB, 0.2-0.7 kg-CODcr/kg-vss/d is suitable for the sludge load and 2-5 m/h is suitable for the upflow velocity, and in the case where the sludge load exceeds 0.7 kg-CODcr/kg-vss/d, or if the upflow velocity exceeds 5 m/h, the granular sludge is easily disintegrated.

Thus, in the case of treating the liquid to be treated having the nature stated above, or in the case of treating a liquid to be treated under the conditions stated above, the present invention can be suitably applied by performing an anaerobic treatment so that nitric acid or nitrous acid (below sometimes referred to as "nitric acid etc.") is supplied as ions to the reaction tank 20. Below, a case which has a structure whereby nitric acid is added to the liquid to be treated and introduced to the reaction tank 20 is explained.

However, the present invention can also be performed by other structures, for example, a nitrous acid solution may be used instead of nitric acid, and a structure may be adopted whereby a solution of nitric acid etc is directly added to the reaction tank 20. In addition, in the case where a pH adjustment is arranged in a stage prior to the reaction tank 20, a solution of nitric acid etc may be added to a pH adjustment tank. Furthermore, while the nitric acids etc which are added to the reaction tank 20 or the path of a liquid to be treated 31 are sometimes immediately consumed within the reaction tank 20, by adding nitric acids etc, they can be included within the liquid within the reaction tank 20 in a short period of time. Consequently, in the case where "the liquid within the reaction tank includes nitric acid etc" then the present invention also includes the case where the added nitric acids etc are consumed almost instantly.

In the treatment apparatus 1, the end of the nitric acid addition path 12 is connected to a midway point of the path of the liquid to be treated 31. The base of the nitric acid addition path 12 is connected with the nitric acid storage tank 11, and the nitric acid solution within the nitric acid storage tank 11 is added to the path of the liquid to be treated 31. A valve V is arranged at a midway point of the nitric acid addition path 12 and the amount and timing of adding the nitric acid is adjusted by opening and closing the valve V.

The solution which contains nitric acids etc is added to the liquid to be treated and it is preferred that it be contacted with the granular sludge in a uniformly dissolved state. It is preferred that the concentration of the nitric acid etc after adding is 1-1000 mg-N/L, more preferably 1-100 mg-N/L. In addition, it is preferred that the nitric acid etc be added so that the ratio of nitrogen (N) with respect to the CODcr of the liquid to be treated becomes 0.1-10% by mass. Furthermore, as a substance which has granular strength improvement effects other than nitric acid or nitrous acid, sugars may be used or sugars and a polymeric flocculant other than nitric acids etc may be combined. Alternatively, inorganic ions such as calcium or magnesium may also be added. By adding these substances in addition to nitric acids etc, it is possible to further increase the granule strength retention effects.

By adding a solution which includes nitric acids etc to the reaction tank 20 in this way, denitrifying microorganisms grow within the reaction tank 20. The microorganisms which perform denitrification by using nitric acid or nitrous acid as a substrate have a higher sludge yield per organic matter compared to microorganisms which perform methane fermentation. In addition, the denitrifying microorganisms also have the capability to form granules. As a result, by supplying nitric acids etc. to the reaction tank 20 and growing denitrifying microorganisms, it is possible to multiply granules having a mixture of methanogens and denitrifying bacteria, and also prevent disintegration of the granules. Consequently, it is possible to stably retain a fixed amount or more of granular sludge within the reaction tank 20.

The granular sludge which is formed by adding nitric acid etc to the reaction tank 20 has a greater strength and excellent treatment capabilities compared to the granular sludge formed by independently multiplying methanogens. The reason for this is that it is assumed that it is possible to increase the strength of granular sludge by making denitrifying microorganisms which have the capability of producing a greater amount of extracellular high molecules coexist with methanogens. In addition, because the metabolic pathway of microorganisms which multiply by using nitric acids etc as a substrate is different to that of methanogens, by making the microorganisms which have different metabolic pathways coexist in the granular sludge and creating a large variety of bacteria which are included in the granular sludge, it is assumed that the treatment capabilities (ability to break down persistent substances etc) of the granular sludge can be increased.

Furthermore, in order to prevent disintegration of the granular sludge because the cohesion of the flocculant is strong in the case of independently adding a flocculant, for example, the particle size of the granular sludge has a tendency to become excessively large. In addition, because an excessive binding force acts in the granular sludge which is bound by the flocculant, that the diffusion of gas from an inner part of the granular sludge is resisted and a ratio of the granular sludge which moves up by including the gas is larger compared to the granular sludge which naturally forms without adding the flocculant. In this way, when the granular sludge binds due to the addition of the flocculant, the density sometimes decreases depending on the amount of flocculant added.

According to the present invention, a viscous substance is produced by the microorganisms attached to the granular sludge and in order to bind microorganisms by the operation of this viscous substance, the inclusion of air bubbles when the granular sludge is formed is reduced and an increasing of the density of the granular sludge can be expected.

Thus, anaerobic treatment is performed by adding nitric acids etc to a midway point of the liquid to be treated path 32. Preferred conditions for an anaerobic treatment in the reaction tank 20 are as above mentioned. In the reaction tank 20, the organic matters within water containing organic matter are broken down by the workings of the granular sludge and a gas including methane is produced. The granular sludge multiplies by using water containing organic matter as a substrate.

A gas-solid separation process is performed within the GSS on the mixed liquid which contains the gas produced in the reaction tank 20 and the multiplied sludge, the gas is extracted from the gas path 33 to the exterior of the reaction tank 20 and stored in a gas holder 30. If the added amount of nitric acids etc does not exceed 10% by mass as N with respect to the CODcr of the liquid to be treated, then the effects of a drop in quality of a gas by including nitrogen gas in the gas produced in the reaction tank 20 can be decreased. The sludge is separated and the liquid content which is purified is extracted to the exterior of the reaction tank 20 from the liquid to be treated path 32. The liquid to be treated may be further treated by an aerobic biological treatment apparatus (not shown in the diagrams) arranged at a latter stage.

Figure 2:
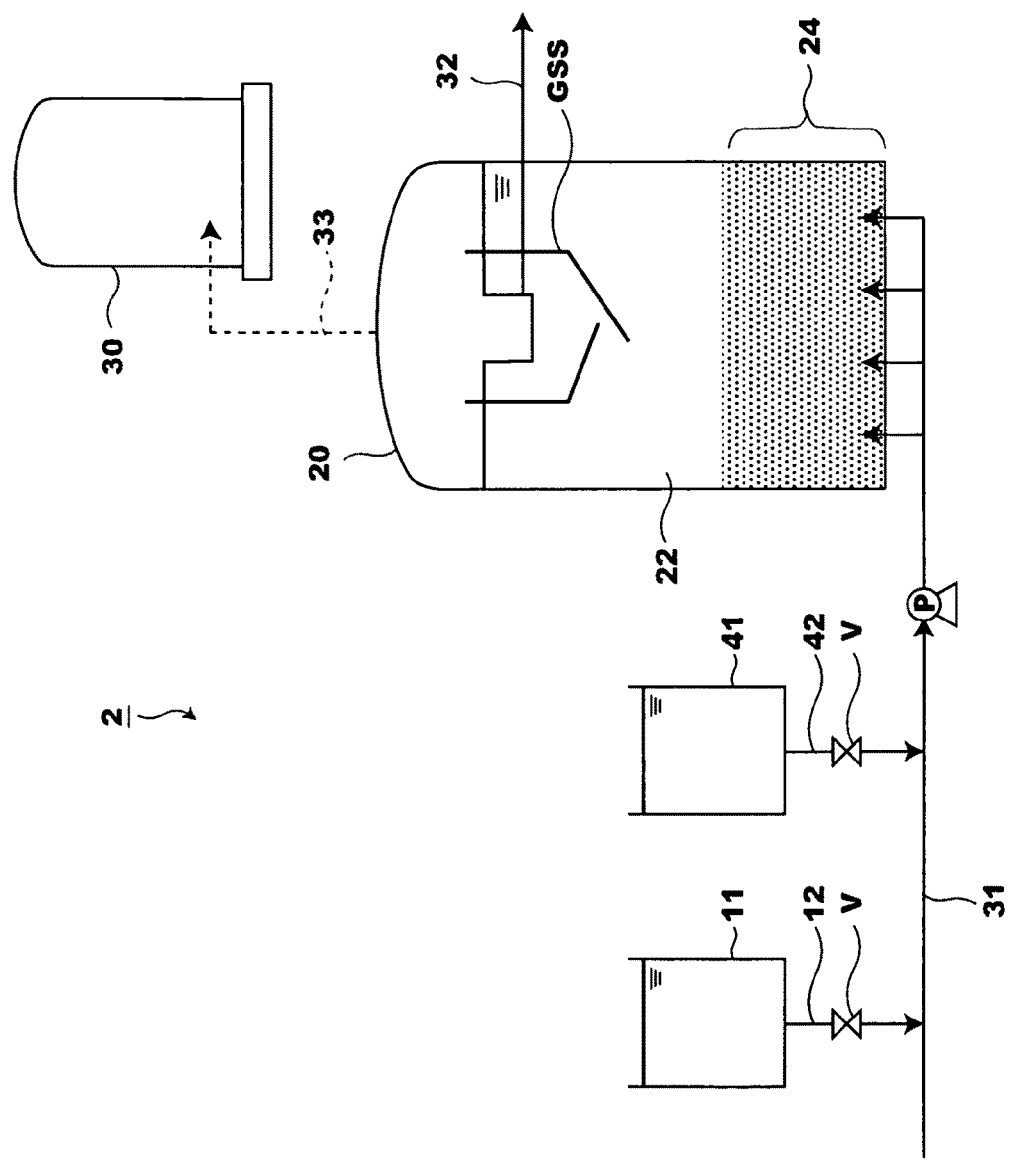
FIG. 2 is an exemplary diagram of biological treatment apparatus related to a second embodiment of the present invention.

FIG. 2 is an anaerobic treatment apparatus 2 which treats water containing organic matter related to a second embodiment of the present invention. The treatment apparatus 2 is arranged with a flocculant path 42 which has an end connected to a midway point of a path of the liquid to be treated 31, and flocculant accumulation tank 41 which is connected to the base end of the flocculant path 42. By this structure, nitric acid etc are added and a liquid to be treated which includes a flocculant is introduced to the reaction tank 20.

By attaching the flocculant to the surface of the granular sludge within the reaction tank 20 it is possible to increase the strength of the granular sludge. The type of flocculant which is added is not limited. A flocculant which is suitable in a nonionic, cationic, anionic or amphoteric treatment system can be used. Preferably, polyacrylamide, polyethylene oxide are examples of a polymeric nonionic flocculant. Examples of a cationic flocculant are polyaminoalkylmethacrylate, polyethylenimine, polydiallylammonium haloid, chitosan and urea-formaldehyde resin. Examples of an anionic flocculant are sodium polyacrylate, partially-hydrolyzed polyacrylamide, partially-sulfomethylated polyacrylamide, poly(2-acrylamide)-2-methylpropane sulfonate. Examples of an amphoteric flocculant are a copolymer of acrylamide, aminoalkylmethacrylate and sodium acrylate. The added concentration of the flocculant should be about 0.01-2 mg/L and in particular 0.01-1 mg/L in the case of a polymeric flocculant.

In this way it is possible to further increase the strength of the granular sludge by including a flocculant in the liquid within the reaction tank 20. In addition, in the present invention, because microorganisms which use the nitric acids etc. as a substrate, are included in the granular sludge and a viscous substance is produced, the amount of flocculant may be small. In addition, the flocculant may be added continuously or intermittently. Furthermore, the flocculant may be added before or after the nitric acids etc.

In addition, a glucide and/or inorganic ions may be added instead of or in addition to adding a flocculant to the liquid within the reaction tank 20. Starch can be suitably used as a glucide with an added amount of 0.1-10% by mass with respect to the CODcr of the liquid to be treated, and in terms of a CODcr ratio, a range of 0.02-0.2 with respect to the CODcr concentration within the liquid to be treated is preferable. It is preferable that the glucide to be added is dissolved and added as a liquid. In the case where starch is used, the starch may be gelatinized and added in a liquid state. Specifically, the pregelatinized starch powder may be dissolved in water and added to the liquid to be treated as a starch liquid, and the gelatinized starch powder may be directly added to the liquid to be treated. Alternatively, a starch which has not been gelatinized, mixed with water and heated or set under alkali conditions may be used as a gelatinized liquid form. By adding starch, the microorganisms which use the starch as a substrate are included in the granular sludge and a viscous substance is produced, and as a result, an addition of a starch contributes to the improvement of the effects of preventing granular sludge disintegration.

Various effluents containing starch which are discharged from a paper making process may be used as a supply source of a starch. Specifically, a coating effluent (coater wastewater) discharged from a coating process, an effluent (DIP wastewater) discharged from a Deinked Pulp manufacturing process, and a paper effluent including a size agent which is discharged from and used in a paper making process may be used independently or mixed as a starch supply source. In the case where an evaporative condensed water is used as the liquid to be treated, it is possible to improve the effective usage of waste by using this type of effluent as the starch supply source.

EXAMPLES

Example 1

The present invention will be explained further below based on examples. In the examples, water containing organic matter with a nature described next, was introduced to an experiment apparatus which resembles the process apparatus 1 shown in FIG. 1 and an anaerobic treatment was performed. The water containing organic matter is a synthetic effluent which includes a methanol concentration (as CODcr) of 2,970 mg/L, 30 g/L of a mixed substrate with a ratio of 1:1 vegetable extract and meat extract as CODcr, and further added with 30 mg-N/L of $NH_4Cl$ as a nitrogen source and 5 mg-P/L of $KH_2PO_4$ as a phosphor source.

In the reaction tank 20, the volume of the reaction section 22 apart from a section where a GSS is arranged with an interior diameter of 6 cm and height of 1.2 m is 3 L and the volume of a section which includes the GSS section is 4 L. The experiment was begun in a state where the start-up of the reaction tank 20 was completed by filling 1.0 L of a granular sludge (1.03-1.1 mm density, 1.2-1.5 mm particle size) extracted from an existing UASB reaction tank of a chemical factory, into the reaction tank 20.

In example 1, a sodium nitrate solution was added to the above stated synthetic effluent by connecting the nitric acid addition path 12 to a midway point of the path of the liquid to be treated 31. An amount of nitric acid was added so that the concentration of nitric acid within a mixed solution after the sodium nitrate solution and liquid to be treated was mixed, was 50 mg-N/L. The synthetic effluent was passed into the reaction tank 20 at a CODcr load of 10 g-CODcr/L/d and sludge load of 0.4-0.7 g-CODcr/g-vss/d. The synthetic effluent was passed so that the upflow velocity became 3 m/h, the granular sludge was developed and a sludge blanket was formed. The temperature within the reaction tank 20 was maintained between 30-35° C. and the pH was adjusted to pH 7.0. pH adjustment was performed by appropriately adding a pH adjuster (acid or alkali) which was accumulated in a pH adjuster tank (not shown in the diagram), to the synthetic effluent which flows in the path of the liquid to be treated 31.

The CODcr concentration of the liquid to be treated which is extracted from the reaction tank 20 was 30-80 mg/L and the CODcr removal rate was 97% or more. In addition, the top end (sludge boundary surface) of the sludge blanket formed by developing the granular sludge increased together with multiplication of the bacteria. As a result, granular sludge of an amount more than the amount of granular sludge at the start of the treatment was continuously maintained within the reaction tank 20 during a 90 day experiment period. At this time, the average particle size of the granular sludge increased and disintegration of the granular sludge could be prevented.

Example 2

In example 2, the sodium nitrate solution and a flocculant were added to the synthetic effluent using a process apparatus 2 shown in FIG. 2. An amount of nitric acid was added so that the concentration of nitric acid within a mixed solution after the sodium nitrate solution and liquid to be treated is mixed, is 20 mg-N/L. In addition, a flocculant was added so that the concentration within a mixed solution after the flocculant and liquid to be treated is mixed, is 0.03 mg-N/L using a cationic polymeric flocculant (polyaminoalkylacrylate). When the experiment was performed with the other conditions the same as example 1, the CODcr concentration of the liquid to be treated was 40-80 mg/L and the CODcr removal rate was 97% or more. In addition, the amount of granular sludge within the reaction tank 20 and the average particle size of the granular sludge also increased.

Example 3

In example 3, a glucide was further added to the synthetic effluent instead of a flocculant using a process apparatus 2 shown in FIG. 2. That is, other than using a glucide instead of a flocculant, example 3 was the same as example 2. A starch powder solution was used as a glucide and the concentration of starch within the solution after the starch powder solution and liquid to be treated is mixed as CODcr was 90 mg-/L. In example 3, the CODcr concentration of the liquid to be treated was 40-80 mg/L and the CODcr removal rate was 97% or more. In addition, the amount of granular sludge within the reaction tank 20 and the average particle size of the granular sludge also increased.

Example 4

In example 4, a flocculant and starch was further added to the synthetic effluent at a stage prior to the reaction tank 20. That is, in example 4, nitric acid, a flocculant and starch were added to the synthetic effluent. The type and amount of flocculant and starch added was the same as in example 2 and 3 respectively while the other conditions were the same as example 2. In example 4, the CODcr concentration of the liquid to be treated was 30-80 mg/L and the CODcr removal rate was 97% or more. In addition, the amount of granular sludge within the reaction tank 20 and the average particle size of the granular sludge also increased.

Comparative Example 1

In comparative example 1, other than not adding nitric acid, the experiment was performed with the same conditions as example 1. As a result, the amount of granular sludge with the reaction tank 20 gradually decreased and the particle size also decreased.

Comparative Example 2

In comparative example 2, other than not adding nitric acid, the experiment was performed with the same conditions as example 2. That is, in comparative example 2, disintegration of the granular sludge was prevented by adding a flocculant. In comparative example 2, the height of the sludge boundary surface gradually decreased and the average particle size also showed a tendency to decrease.

Comparative Example 3

Then, in comparative example 3, the amount of added flocculant was increased from 0.03 mg/L to 1.2 mg/L and the experiment was performed with other conditions the same as comparative example 2. As a result, in comparative example 3, while the average particle size increased the height of the sludge boundary surface showed a slight decrease. This is because without obtaining agglutination because the amount of added flocculant is too small in comparative example 2, floating of the granular sludge occurs due to the involvement of gas because the cohesion is too strong in comparative example 3.

Figure 3:
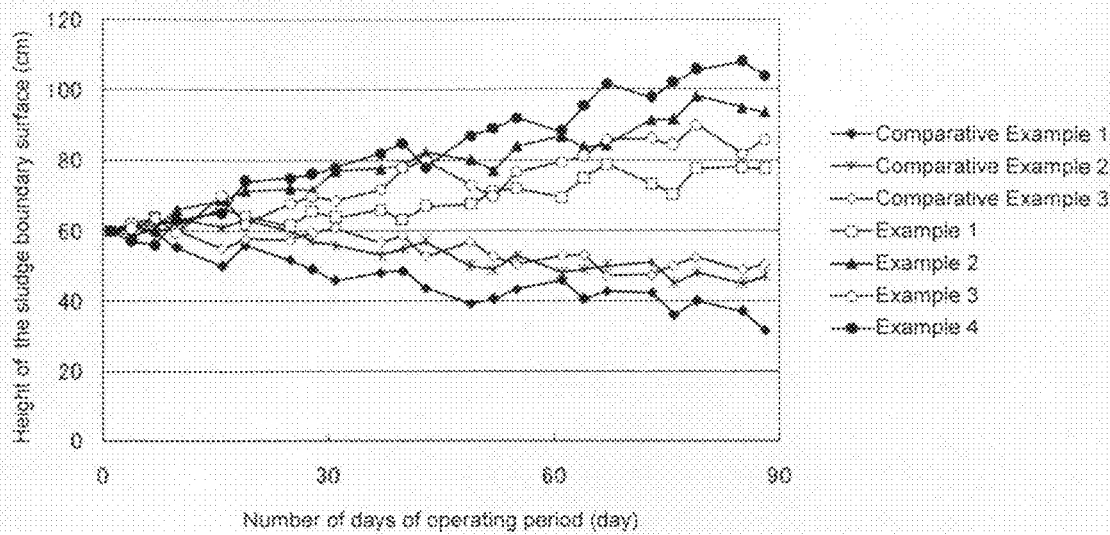
FIG. 3 is a diagram which shows the results of an example and a comparative example.

A change in the height of a sludge boundary surface within the reaction tank 20 is shown in FIG. 3 and a change in the average particle size of the granular sludge is shown in FIG.

Figure 4:
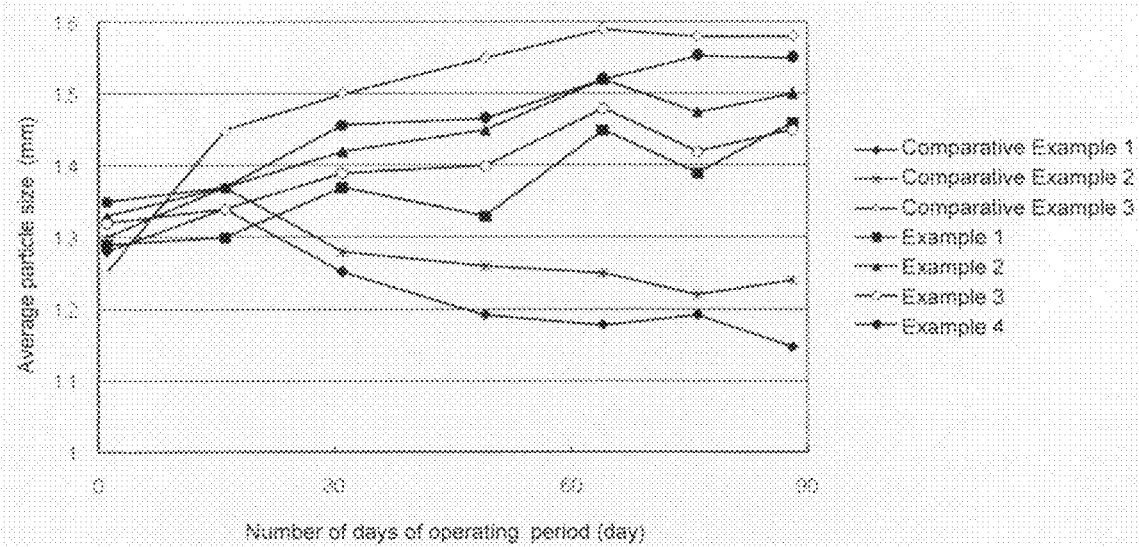
FIG. 4 is a diagram which shows the results of an example and a comparative example.

4 related to the examples 1-4 and comparative examples 1-3. As is shown in FIG. 3 and FIG. 4, it was possible to continuously retain a certain amount of granular sludge with more than a certain particle size in the reaction tank 20 in the examples. However, disintegration of the granular sludge occurred in the comparative examples.

Reference Example 1

In reference example 1, starch is added instead of nitric acid. An amount of starch was added so that the concentration of starch within a liquid after the starch has been mixed with the liquid to be treated became within the range of CODcr 90 mg-/L. The starch was added to the path of the liquid to be treated 31 as a liquid in which pregelatinized powder is dissolved in water was added. Other than adding starch instead of nitric acid, the experiment was performed with the same conditions as example 1.

In reference example 1, the CODcr concentration of the liquid to be treated which was extracted from the reaction tank 20 was 40-80 mg/L and the CODcr removal rate was 97% or more. In addition a decrease in the height of the top end (sludge boundary surface) of the sludge blanket which is formed by developing the granular sludge was not observed and the granular sludge of an amount more than the amount of granular sludge at the start of the treatment was continuously maintained within the reaction tank 20 during a 90 day experiment period. At this time, it was possible to prevent disintegration of the granular sludge without a decrease in the average particle size of the granular sludge.

Reference Example 2

In reference example 2, a flocculant was further added to the synthetic effluent using a process apparatus 2 shown in FIG. 2. A flocculant was added so that the concentration within a mixed solution after the flocculant and liquid to be treated is mixed, is 0.03 mg-N/L using a cationic polymeric flocculant (polyaminoalkylacrylate). When the experiment was performed with the other conditions the same as reference example 1, the CODcr concentration of the liquid to be treated was 40-80 mg/L and the CODcr removal rate was 97% or more. In addition, the amount of granular sludge within the reaction tank 20 did not decrease, the average particle size did not decrease and a decrease in density was not observed.

Figure 5:
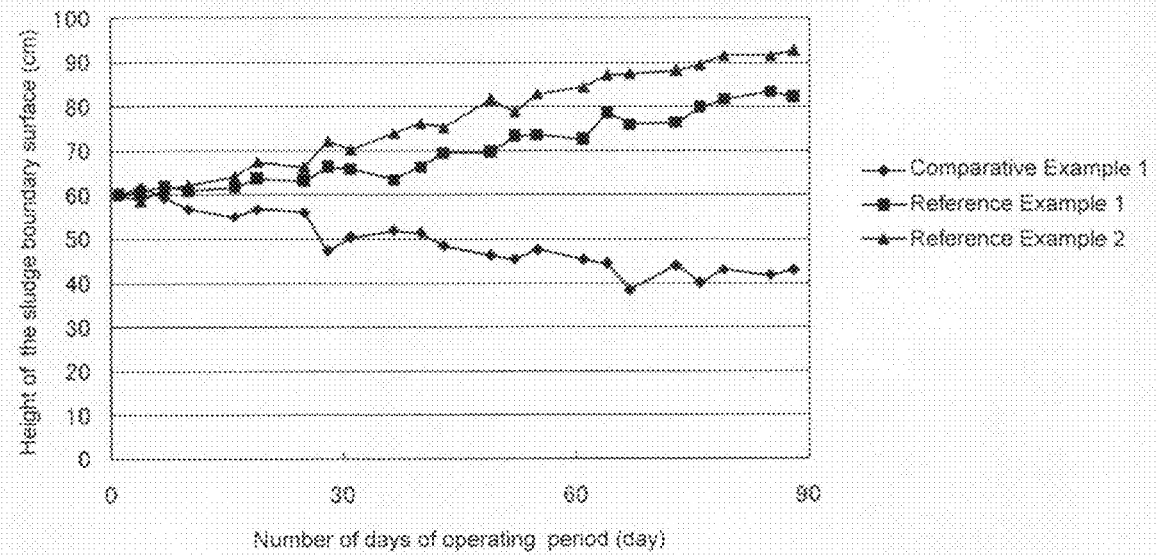
FIG. 5 is a diagram which shows the results of a reference example and a comparative example.
Figure 6:
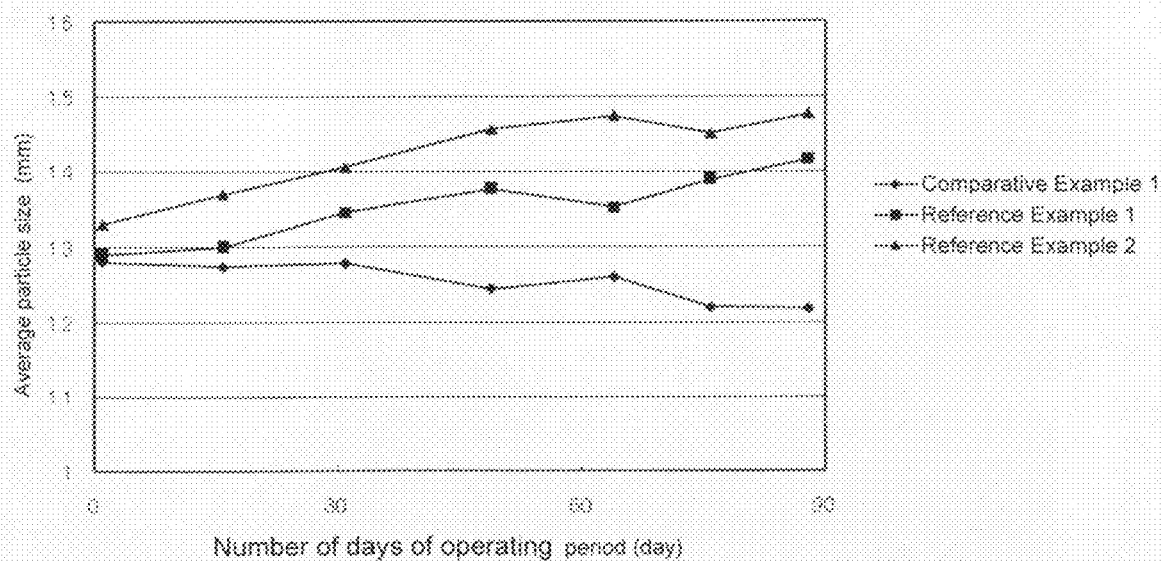
FIG. 6 is a diagram which shows the results of a reference example and a comparative example.

The results of reference example 1 and 2 are shown in FIG. 5 and FIG. 6. The results of comparative example 1 are also shown in FIG. 5 and FIG. 6. FIG. 5 shows the change in a sludge boundary surface height within the reaction tank 20, and FIG. 6 shows the change in average particle size of the sludge. As is shown in FIG. 5 and FIG. 6, even if starch is used alone or with a flocculant instead of nitric acid, it is possible to obtain a certain amount of granular sludge disintegration prevention effects.

Reference Example 3

In reference example 3, instead of the synthetic effluent in example 1, evaporative condensed water which is discharged from a pulp making process is made the liquid to be treated and supplied to the reaction tank 20 in FIG. 1 at a pass through volume of 11 L/d. In addition, as a starch supply source, a coating effluent discharged from a coating process, was added to the path of the liquid to be treated 31 at a volume of 4.2 L/d. The organic matter concentration as CODcr of the evaporative condensed water was 2,700 mg/L, of which the concentration of methanol was 1,500 mg/L. The organic matter concentration as CODcr of the coating effluent was 700 mg/L and starch was included with a concentration of 100-200 mg/L. The coating effluent was added so that the CODcr ratio of the coating effluent derived from the CODcr of the mixed liquid obtained after adding the coating effluent to the evaporative condensed water was about 10%.

Other than adding the coating effluent instead of nitric acid and instead of the liquid to be treated being obtained from the synthetic effluent changed to being obtained from the evaporative condensed water, the experiment was performed under the same conditions as example 1. As a result, the upper end (sludge boundary surface) height of the sludge blanket formed by developing granular sludge within the reaction tank 20 increases, and the granular sludge of an amount more than the amount of granular sludge at the start of the treatment was continuously maintained within the reaction tank 20 during a 90 day experiment period. At this time, the average particle size of the granular sludge increased and it was possible to prevent disintegration of the granular sludge.

Reference Example 4

In reference example 4, a flocculant was further added to the path of the liquid to be treated 31. A cationic polymeric flocculant (polyaminoalkylacrylate) was used and an amount was added so that the concentration after the flocculant and liquid to be treated was mixed, is 0.1 mg/L. When the experiment was performed with the other conditions the same as reference example 3, the amount of granular sludge within the reaction tank 20 increased and the average particle sizes also increased.

Example 5

In example 5, other than further adding a sodium nitrate solution to the path of the liquid to be treated 31, the experiment was performed under the same conditions as reference example 3. An amount of nitric acid was added so that the concentration of nitric acid after the sodium nitrate solution and liquid to be treated is mixed, is 20 mg-N/L. A coating effluent was added to the path of the liquid to be treated 31 with a volume of 4.2 L/d the same as reference example 3. Even in example 5 where the coating effluent is added as a starch supply source in addition to nitric acid, the amount of granular sludge within the reaction tank 20 increased and the average particle size also increased.

Example 6

In example 6, other than further adding a flocculant to the path of the liquid to be treated 31, the experiment was performed under the same conditions as reference example 5. Specifically, in example 6, nitric acid (added concentration of 20 mg-N/L), flocculant (added concentration of 0.1 mg/L) and a coating effluent (added volume of 4.2 L/d) were added to an evaporative condensed water. The type of nitric acid and flocculant were the same as in reference example 4 and example 5 respectively and the other conditions were the same as reference example 3. Even in example 6, the amount of granular sludge within the reaction rank 20 increased and the average particle size also increased.

Comparative Example 4

In comparative example 4, a coating effluent was not supplied to the reaction tank 20. Other than this, the experiment was performed under the same conditions as reference example 3. As a result, the amount of granular sludge within the reaction tank 20 decreased slightly and the particle size also decreased.

Figure 7:
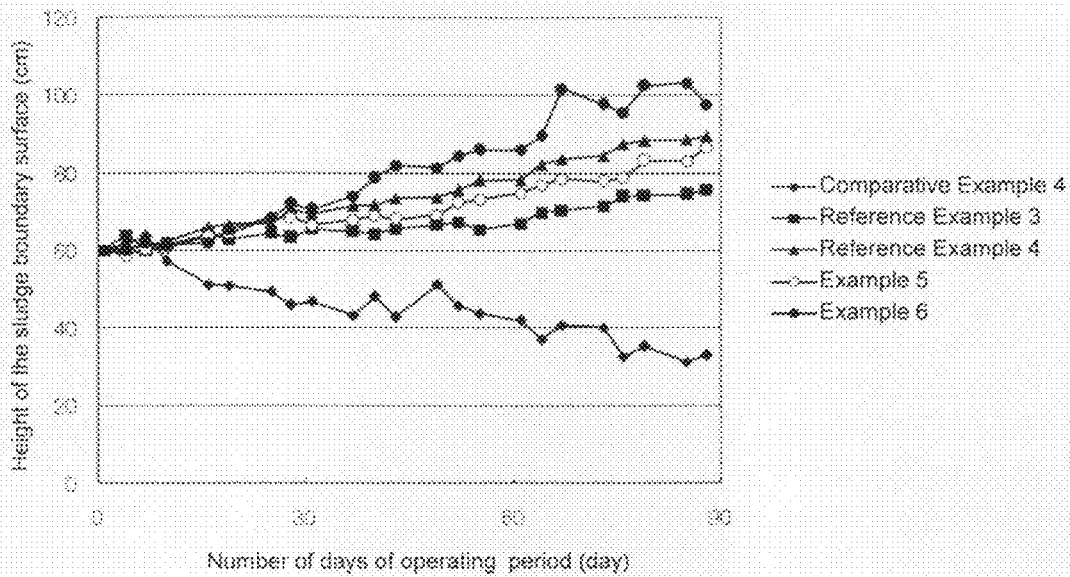
FIG. 7 is a diagram which shows the results of a reference example, an example and a comparative example.
Figure 8:
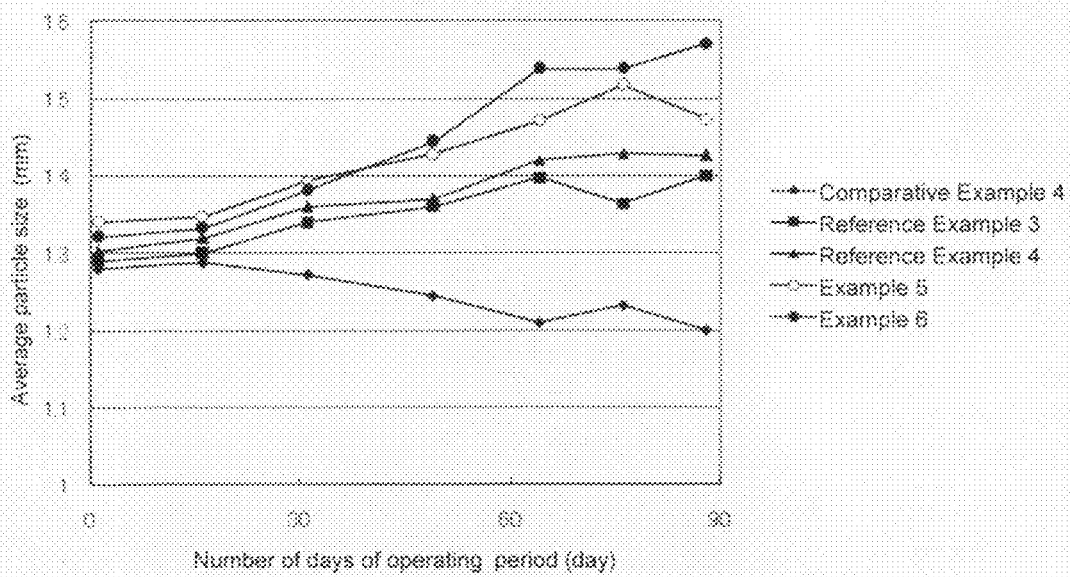
FIG. 8 is a diagram which shows the results of a reference example, an example and a comparative example.

The results of reference example 3, reference example 4, example 5, example 6 and comparative example 4 are shown in FIG. 7 and FIG. 8. FIG. 7 shows the change in height of the sludge boundary surface within the reaction tank 20 and FIG. 8 shows the change in average particle size of the sludge. As is shown in FIG. 7 and FIG. 8, even when a coating effluent is added to the liquid to be treated it is possible to obtain a certain amount of granular sludge disintegration prevention effects and if nitric acid and the coating effluent are combined and added the liquid to be treated it is possible to further increase the granular sludge disintegration prevention effects.

The present invention can be preferably used in a treatment of water containing organic matter which has methanol such as evaporative condensed water etc discharged from a paper making factory as its main ingredient.

According to the present invention it is possible to prevent disintegration of a granular sludge. Therefore, it is possible to stably and continuously perform a high-load high velocity treatment over a long period of water containing organic matter in which it was conventionally difficult to support and multiply a granular sludge.

What is claimed is:

1. A method of anaerobic treatment, comprising:
   introducing a liquid to be treated to a reaction tank which retains a granular sludge; and
   contacting the liquid to be treated with the granular sludge while adding nitric acid, nitrate salt, nitrous acid or nitrite salt to the liquid to be treated or the reaction tank,
   wherein a liquid which contains nitric acid or nitrous acid is added to the liquid to be treated or the reaction tank so that N becomes equal to or larger than 0.1% and equal to or less than 10% by mass with respect to CODcr of the liquid to be treated.

2. The method of anaerobic treatment according to claim 1, wherein at the time of flowing the liquid to be treated to the reaction tank, nitric acid, nitrate salt, nitrous acid or nitrite salt is added so that the concentration of nitric acid or nitrous acid is in a range of 1 to 1,000 mg-N/L.

3. The method of anaerobic treatment according to claim 1, wherein the organic matter content with a carbon number of 4 or less in the liquid to be treated is equal to or more than 70% by mass of the total organic matter content.

4. The method of anaerobic treatment according to claim 1, wherein the liquid to be treated contains at least one agent chosen from a group consisting of a chelating agent, a scale dispersant, and a bactericidal agent.

5. The method of anaerobic treatment according to claim 1, wherein the anaerobic treatment is performed while supplying a flocculant to the reaction tank.

6. The method of anaerobic treatment according to claim 1, wherein a liquid containing a glucide is introduced to the reaction tank.

7. A method of anaerobic treatment comprising:
   introducing a liquid to be treated to a reaction tank which retains a granular sludge; and
   contacting the liquid to be treated with the granular sludge while adding one or more substances from a group consisting of nitric acid, nitrate salt, nitrous acid, nitrite salt and glucide to the reaction tank or the liquid to be treated,
   wherein a liquid which contains nitric acid or nitrous acid is added to the liquid to be treated or the reaction tank so that N becomes equal to or larger than 0.1% and equal to or less than 10% by mass with respect to CODcr of the liquid to be treated, and
   a liquid which contains glucide having a range of equal to or larger than 0.1% and equal to or less than 10% by mass with respect to the CODcr of the liquid to be treated is added to the liquid to be treated or the reaction tank.

8. A method of anaerobic treatment including introducing a liquid to be treated to a reaction tank which retains a granular sludge, comprising:
   adding glucide to the reaction tank or the liquid to be treated; and
   contacting the liquid to be treated with the granular sludge in the case where the amount of organic matter which have a carbon number of four or less contained in the liquid to be treated are 70% by mass or more of the total contained organic matter, or in the case where the liquid to be treated contains one or more agents chosen from a group consisting of a chelating agent, a scale dispersant, and a bactericidal agent, or in the case where the sludge load introduced to the reaction tank exceeds 0.3 KgCODcr/kg-vss/d or a upflow velocity within the reaction tank exceeds 1 m/h,
   wherein the liquid to be treated is evaporative condensed water which is discharged by a pulp manufacture process.

9. The method of anaerobic treatment according to claim 8, wherein the glucide is starch.

10. The method of anaerobic treatment according to claim 9, wherein a starch which has been gelatinized is added as the glucide.

11. The method of anaerobic treatment according to claim 9, wherein the starch is added so that the added amount of starch has a CODcr ratio of 0.02-0.2 with respect to a CODcr concentration of the liquid to be treated.

12. The method of anaerobic treatment according to claim 9, wherein the liquid to be treated is evaporative condensed water which is discharged by a pulp manufacture process, and adding nitric acid or nitrous acid so that the concentration after adding nitric acid or nitrous acid to the reaction tank or liquid to be treated becomes 1-1000 mg/L.

13. The method of anaerobic treatment according to claim 8, wherein the anaerobic treatment is performed while supplying a flocculant to the reaction tank.

* * * * *

UNITED STATES PATENT AND TRADEMARK OFFICE
CERTIFICATE OF CORRECTION

PATENT NO. : 7,972,511 B2  
APPLICATION NO. : 12/591163  
DATED : July 5, 2011  
INVENTOR(S) : Takaaki Tokutomi et al.

It is certified that error appears in the above-identified patent and that said Letters Patent is hereby corrected as shown below:

Title page 1, after Prior Publication Data US 2010/0133180 A1 June 3, 2010, please insert the following -- Related U.S. Application Data

(63) Continuation of application No. PCT/JP2008/055003,
Filed on March 18, 2008

(30) Foreign Application Priority Data

May 11, 2007 (JP)................2007-126540  
May 11, 2007 (JP)................2007-126596  
May 11, 2007 (JP)................2007-126548 --

Signed and Sealed this
Fourth Day of October, 2011

David J. Kappos
*Director of the United States Patent and Trademark Office*